Nov. 5, 1963    E. L. HIGHLEY    3,109,471
GRISTLE SHEARING RING FOR COMMINUTING APPARATUS
Filed April 12, 1961    2 Sheets-Sheet 1

INVENTOR.
EVERETT L. HIGHLEY
BY

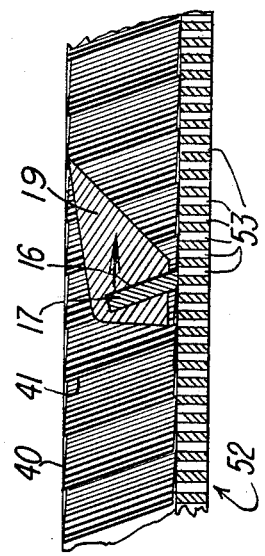
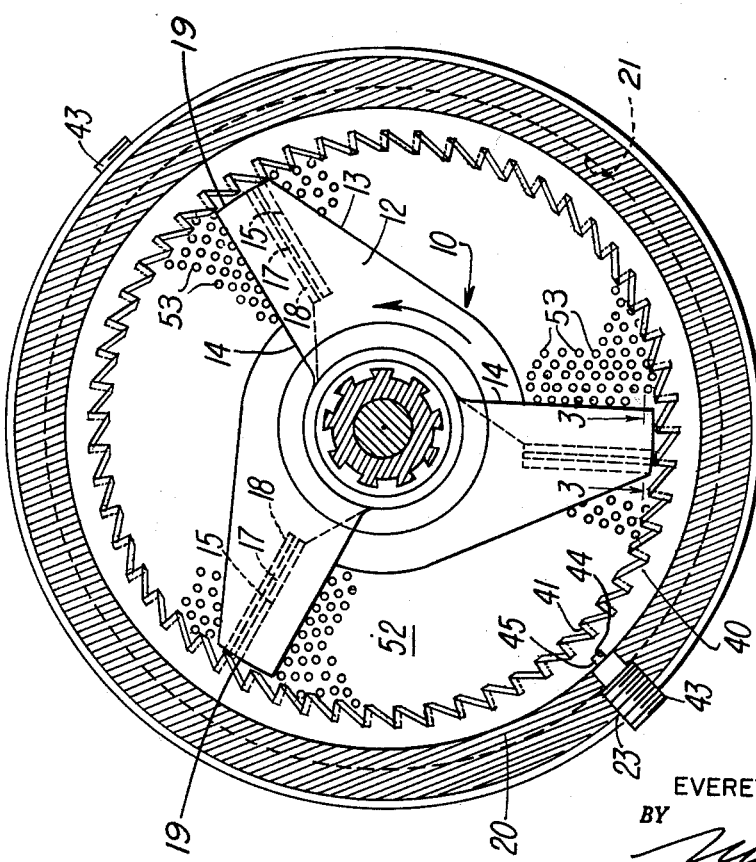

United States Patent Office 3,109,471
Patented Nov. 5, 1963

3,109,471
GRISTLE SHEARING RING FOR COMMINUTING APPARATUS
Everett L. Highley, Fort Wayne, Ind., assignor to Chemetron Corporation, Chicago, Ill., a corporation of Delaware
Filed Apr. 12, 1961, Ser. No. 102,463
12 Claims. (Cl. 146—182)

This invention relates in general to a comminuting apparatus designed for use primarily in connection with the comminution and emulsifying of animal foodstuffs and the like, as, for example, non meaty parts of domestic animals. Certain parts of such animal products are not considered palatable ordinarily but when comminuted and emulsified, are converted with meaty portions into a homogeneous mass of a viscous nature and the whole properly seasoned and cooked is thus rendered highly palatable. Commercial sausage is made of such materials. The comminuting apparatus is, however, capable of other uses and may, if desired be employed for the comminution of other comestibles, as, for example, vegetable products or mixtures of vegetable and meat products.

The invention is particularly concerned with comminuting apparatus of the above referred to type, wherein a cutting head having a plurality of cutting blades or knives is driven by a suitable prime mover, such as an electric motor, and rotates within a housing in shearing relation to a perforate plate and gristle breaking lugs, comminution of the material taking place within the housing on one side of the shear plate, and then extruded through the perforations in the shear plate by inclined surfaces on the blades into a discharge chamber from whence the comminuted material is discharged. Such a comminuting apparatus is disclosed in C. W. Schmidt et al. application Serial No. 832,799, filed August 10, 1959, now Patent No. 3,076,489 to which reference may be had for greater detail.

In a machine of the type briefly outlined above, the rate at which the product can be comminuted and emulsified is dependent largely, on how efficiently tendons, ligaments, small bone nodules and other forms of gristle are effectively broken, ruptured, divided, severed or otherwise operated upon preparatory to the shearing action of the cutter assembly against the shear plate. Such non meaty and fatty materials will for convenience be referred to hereinafter as "gristle."

It is therefore a primary object of this invention to provide in such an apparatus novel gristle breaking and preshearing means to effectively precomminute particles or lumps of material relatively harder or tougher than the meaty and fatty portions and to effectively feed such particles to the blades and the perforated shear plate for final communition, thus increasing efficiency and production.

Briefly, in carrying out this primary object, the invention contemplates the provision of a disposable hardened steel dual pre-gristle comminuting and directing ring which is secured to the radial wall of the cutting chamber. The ring has an inner serrated or toothed surface disposed outwardly of but in close proximity to the face ends of the cutter blade supports for shearing gristle and the like therebetween, and directing or feeding the thus precomminuted product to the shear plate for further final shearing action.

More particularly, in carrying out the primary object, the serrated teeth are so fashioned angularly across the width of the ring relative to the outer gristle shearing edges of the cutter blades and blade supports that the teeth serve as guideways for guiding the comminuted product toward the shear plate.

Other objects and advantages of the invention, will become more apparent as the following description proceeds taken in conjunction with the accompanying drawings in which:

FIG. 2 is a sectional view on an enlarged scale taken along the line 2—2 of FIG. 1;

FIG. 3 is a sectional view on an enlarged scale taken along line 3—3 of FIG. 2.

Figure 1:
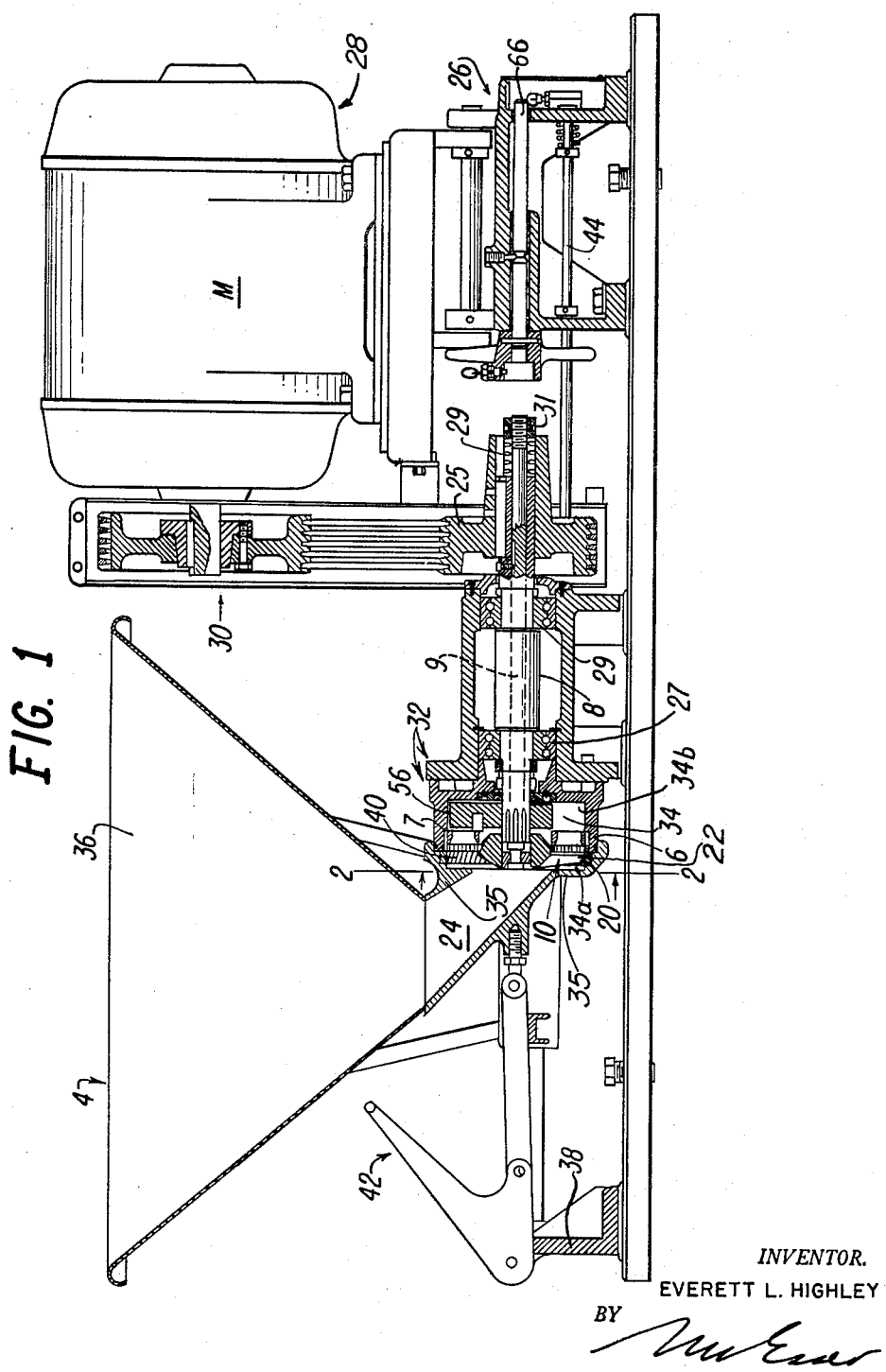
FIG. 1 is a longitudinal sectional view of an assembled comminuting apparatus of the Schmidt et al. type embodying the present invention.

Referring now in greater detail to FIG. 1, the apparatus 4 involves in its general organization five principal portions including a comminuting and emulsifying portion 22, a feed hopper 24, a combined motor support and tool assembly 26, a motor assembly 28 and a transmission 30 between the motor assembly and the comminuting assembly 22. The comminuting assembly 22 includes a generally cylindrical housing 32 providing, in combination with a portion of the feed hopper 24 a chamber 34 which encloses the comminuting instrumentalities coacting with the gristle shearing ring of the present invention. The feed hopper assembly 24 includes a hopper 36 which is slidable on a base support 38 toward and away from the housing 32 and into and out of engagement with the latter. When the hopper 36 is in its closed position materials loaded into the hopper will flow to the comminuting instrumentalities within cutting chamber 34a, and are comminuted and extruded through the shear plate 52, and discharged from the discharge portion 34b of the chamber 34 through a discharge conduit. When the feed hopper 36 is in its retracted or open position, the comminuting instrumentalities are accessible for inspection or cleaning purposes. Movement of the hopper toward and away from the housing 32 is manually effected by a toggle mechanism 42. A more detailed description and operation of the various principal portions of the comminuting apparatus may be found in the referenced Schmidt et al. patent.

A tubular rotary drive shaft 8 extends through the chamber sections 34a and 34b journalled in anti-friction bearings 27 and 29 and projects a slight distance forwardly of a rim 6 of the casing 7. The rear end of the shaft 8 carries a pulley 25 rotated through a belt transmission 30 by motor M. Spring 29 circumscribing the outer end portion of a rod 9 extending through the tubular shaft, is utilized in conjunction with a nut 31 and the tool assembly 26 for tensioning the rod and consequently drawing the cutter assembly 10 against a perforate shear plate 52 as described in the Schmidt et al. patent.

Mounted on the other end of the shaft 8 preferably with means permitting a limited amount of play in the manner described in the Schmidt et al. patent, the cutter assembly 10 is adapted to comminute and emulsify the food product as it is received from the hopper 36. The cutter assembly 10 involves in its general organization a cutter body or head 11 in the form of a three-arm spider or blade support extending from a central hub. The hub is movable within a central opening in the shear plate 52. Extending from the hub of the cutter body 11 are three radial knife-supporting arms 12. The trailing edges 13 of the arms are approximately tangential to the body, and the front cutting edges 14 extend radially of the body and forms product penetrating edges. Faces 15 of each arm 12 is formed with a generally radially extending groove 16 (FIG. 3) which receives a knife blade 17 preferably in the form of a hardened steel plate, which projects outwardly beyond the face 15 and is provided with a sharp shearing edge 18 adapted to sweep in fractional engagement over the adjacent face of the shear plate 52.

The shear plate is preferably clamped to a backing spider as described in the Schmidt et al. patent. A series of perforations 53 (FIG. 3) are provided in accordance with the desired fineness of the product to be comminuted.

The comminuting and emulsifying instrumentalities and the gristle breaking means cooperate to pre-cut the various forms of gristle which are reduced in size by a shearing action which is effected between the outer ends of the knife-supporting arms 12 and a series of gristle shearing or breaking teeth 41 on the ring 40.

The gristle shearing ring 40 is secured in an annular recess 21 of the rim 20 of the hopper throat 24 next adjacent the perforate shear plate 52 by means of cap screws 43 extending through threaded holes 23 in the rim 20, and a nipple 44 on the inner end of the screws extending into a recess 45 in the ring 40. Thus, the ring 40 may be easily removed and replaced by a new toothed ring when the need arises, or the serrated teeth of the original ring may be resharpened and the ring afterwards remounted. The ring 40 may also be remounted in reverse, that is, with the opposite side of the ring 40 against the annular recess 21, thus providing a gristle shearing ring that is "reversible."

The gristle shearing serrated teeth 41 (FIG. 2) are preferably in the form of annular ratchet teeth the roots of which are formed with a face extending radially and the other face sloping between 20° and 60°, and preferably between about 30° and 60° on the ring 40. The teeth 41 and roots are disposed angularly across the inner face of the ring at about 20°, as best seen in FIG. 3, serving to guide the pre-comminuted gristle toward the perforate shear plate 52 for further comminution. Moreover, the non radial, sloping surfaces of the teeth correspond approximately in direction to the vector defining the resultant forces exerted against the teeth through the gristle by the radially sweeping outer cutting edges 19 of the cutter arms 12.

The additional guidance of the pre-sheared gristle in addition to the severing action of the teeth increases production due to the gristle being received at the perforated shear plate 52 in substantially pre-comminuted particles for easier final comminution. The gristle which is frequently expelled by gristle breaking means in former practices rather than fully broken tends to clog the perforations or be recirculated. Now by this combined positive pre-shear and guide arrangement, the gristle is fully comminuted much faster. In fact, this combined pre-shear and guide arrangement has increased production over the most efficient previously known sausage meat comminuters by a factor or two. This is most important to purchasers of such comminuting apparatus looking for increased production together with superior quality.

The sloped leading edges 14 of the cutter assembly 10 exert an impelling force on the product including the pre-comminuted gristle as the arms 12 penetrate the latter and the product is forced toward the shear plate 52 where it is subjected to a region of relatively high pressure in the vicinity of the plate and thus readily passes through the perforations to the chamber on the opposite sides of the plate. The comminuted material is thereafter ejected through an opening in the chamber portion 34b into a suitable receiving receptacle.

The hopper throat 24 is restricted in comparison to the hopper throat disclosed in the referenced Schmidt et al. application. The throat 24 elliptical in cross section is reduced or truncated terminating in the outlet end of the throat which has been reduced approximately ⅝ to ⅚ the diameter of the cutting chamber 34. This restriction ahead of the cutting blades prevents recirculation of the pre-sheared food product due to the increased baffling action of the wall 35 of chamber 34a and the higher pressure exerted on the product in the throat 24 by virtue of the restriction. This can be readily appreciated from FIG. 1.

While one specific and preferred form of the present invention has been illustrated and described, it will be understood that other forms will be suggested to those skilled in the art and all such that do not depart from the spirit of this invention are intended to fall within its scope as best defined in the appended claims.

What is claimed is:

1. An apparatus for comminuting food products, comprising a cutting assembly having a perforated plate and a plurality of rotating cutter blades overlying said plate and cooperating therewith to comminute said food products, a plurality of serrated teeth, said cutter blades having at their distal ends outer cutting edges shaped and positioned at such close proximity to said serrated teeth that gristle in the food product is sheared between the cutting edges and the teeth, and said serrated teeth having cutting edges extending generally in the direction of movement of food products towards said perforated plate, the cutting edges of said teeth being formed by teeth faces intersecting to define an edge, one of said faces extending from the tooth edge away from the longitudinal axis of the cutting assembly and said one face being angularly disposed relative to the longitudinal axis of the cutting assembly to provide a propelling force for directing the sheared food products towards said plate.

2. Apparatus for comminuting food products as claimed in claim 1, wherein said serrated teeth are disposed in a circular path within a replaceable ring concentrically positioned in close proximity with the outer cutting edges of said cutter blades.

3. Apparatus for comminuting food products as claimed in claim 1, including a retractable hopper having a throat rim in axial alignment with said cutting assembly and movable between an operative and a retracted position, said ring being removably mounted within said throat rim and being accessible when the hopper is retracted, said serrated teeth being concentrically positioned closely adjacent the parts of the outer edges of said cutting blades when said hopper is in its said operating position.

4. Apparatus for comminuting food products, comprising a housing, a perforated shear plate extending across said housing and dividing the interior of said housing into a product-receiving and a product discharge chamber, a cutter blade support including a central hub and a plurality of blade supporting arms having outer end shearing surfaces extending outwardly from said hub, a cutter blade on each arm having an edge for shearing cooperation with one side of said shear plate, means for rotating said cutter blade support within said chamber, a hopper having a throat including a rim in engagement with a rim on said product receiving chamber, and a gristle shearing ring having serrated teeth removably mounted within said hopper throat rim and positioned in close proximity to the outer edges of said cutter blades and said supporting arms, said serrated teeth being angularly disposed relative to the outer edges of said cutter blades and supporting arms for shearing gristle and the like in said food product and guiding said sheared gristle toward said perforate plate for further comminution between said perforate plate and the shearing edges of said cutter blades.

5. An apparatus for comminuting food products, comprising a cutting assembly having a plurality of rotating cutter blades, a plurality of serrated teeth, said cutter blades having outer cutting edges shaped and positioned at such close proximity to said serrated teeth that gristle in the food product is sheared between the teeth and the outer cutting edges, said serrated teeth having a first face extending substantially radially and a second face sloping with respect to said first face at substantially 45°, and said faces intersecting to form a cutting edge disposed angularly from about 20° to 60° from any radial plane extending through the longitudinal axis of said cutter assembly, whereby said teeth provide a propelling force to direct comminuted food products in a direction extending axially of the cutter assembly.

6. An apparatus for comminuting food products, comprising a cutting chamber, a cutting assembly having a plurality of rotating cutter blades, a plurality of serrated teeth arranged in a ring, said cutter blades having outer cutting edges adapted and arranged for rotation in close proximity to said serrated teeth for shearing food product, said teeth being angularly disposed relative to the longitudinal axis of the cutting chamber, a retractable hopper having a throat including a throat rim in axial alignment with said chamber, said ring being removably mounted within said throat rim and being accessible for removal when the hopper is retracted, said serrated teeth being concentrically positioned closely adjacent to the outer edges of said cutter blades when said hopper is in its operative position, and the diameter of the outlet end of said hopper throat being restricted substantially in comparison to the diameter of said ring.

7. An apparatus for comminuting food products as claimed in claim 6, in which the diameter of the outlet end of said hopper throat is between ⅝ to ⅚ smaller than the diameter of the cutting chamber.

8. The apparatus defined by claim 4 wherein each of the serrated teeth has a cutting edge extending generally in the direction of movement of food products towards said perforate plate, the cutting edge of the serrated teeth being formed by first and second intersecting faces, said first face extending from the tooth edge away from the axis of rotation of the cutter blade support and said first face being angularly disposed relative to said axis to provide a propelling force for directing the sheared food products towards said perforate plate for said further comminution.

9. The apparatus defined by claim 8 wherein said first face extends substantially radially and wherein said second face slopes with respect to said first face at an angle of about 45°, the angular disposition of the tooth cutting edge being from about 20° to 60° from any radial plane extending through said axis.

10. Apparatus for comminuting food products, comprising a housing, a perforate shear plate extending across said housing and dividing the interior of said housing into a product-receiving and a product discharge chamber, a cutter blade support including a central hub and a plurality of blade supporting arms extending outwardly from said hub having outer end shearing surfaces, a cutter blade on each arm having an edge for shearing cooperation with one side of said shear plate, means for rotating said cutter blade support within said chamber, a hopper having a throat including a rim in engagement with a rim on said product receiving chamber, a gristle shearing ring having serrated teeth positioned next adjacent said perforate shear plate, and means for removably mounting said ring in said position said serrated teeth being disposed outwardly of but in close proximity to the outer ends of said cutter blades and said supporting arms, said serrated teeth being disposed relative to the outer ends of said cutter blades and supporting arms to shear gristle and the like in said food product and to direct said sheared gristle for further comminution between said perforate plate and the shearing edges of said cutter blades.

11. Apparatus for comminuting food products, comprising a housing, a perforate shear plate extending across said housing and dividing the interior of said housing into a product-receiving and a product discharge chamber, a cutter blade support including a central hub and a plurality of blade supporting arms extending outwardly from said hub having outer end shearing surfaces, a cutter blade on each arm having an edge for shearing cooperation with one side of said shear plate, means for rotating said cutter blade support within said chamber, a hopper having a throat including a rim in engagement with a rim on said product receiving chamber, and a gristle shearing ring having serrated teeth and removably mounted within said hopper throat rim and positioned in close proximity to the outer ends of said cutter blades and said supporting arms, said serrated teeth being disposed relative to the outer ends of said cutter blades and supporting arms to shear gristle and the like in said food product and to direct said sheared gristle for further comminution between said perforate plate and the shearing edges of said cutter blades, each of the serrated teeth having a cutting edge extending generally in the direction of movement of food products towards said perforate plate, the cutting edges of the serrated teeth being formed by first and second intersecting faces, said first face extending from the tooth edge away from the axis of rotation of the cutter blade support and said first face being angularly disposed relative to said axis to provide a propelling force for directing the sheared food products towards said perforate plate for said further comminution.

12. The apparatus defined by claim 11 wherein said first face extends substantially radially and wherein said second face slopes with respect to said first face at an angle of about 45°, the angular disposition of the tooth cutting edge being from about 20° to 60° from any radial plane extending through said axis.

References Cited in the file of this patent

UNITED STATES PATENTS

| 2,305,467 | Davis et al. | Dec. 15, 1942 |
| 2,641,797 | Waltman | June 16, 1953 |
| 2,665,725 | Lundell | Jan. 12, 1954 |
| 2,977,056 | Gustke | Mar. 28, 1961 |
| 3,076,487 | Illsley | Feb. 5, 1963 |

FOREIGN PATENTS

| 341,744 | Italy | July 9, 1936 |